(12) United States Patent
Mauderer et al.

(10) Patent No.: US 11,662,544 B2
(45) Date of Patent: May 30, 2023

(54) LENS HOLDING BLOCK AND METHOD FOR BLOCKING, UNBLOCKING AN OPTICAL LENS COMPONENT

(71) Applicant: Essilor International, Charenton-le-Pont (FR)

(72) Inventors: Michael Mauderer, Baar (CH); Holger Schaefer, Baar (CH); Herger Alt, Baar (CH)

(73) Assignee: Essilor International, Charenton-le-Pont (FR)

( * ) Notice: Subject to any disclaimer, the term of this patent is extended or adjusted under 35 U.S.C. 154(b) by 1068 days.

(21) Appl. No.: 16/361,285

(22) Filed: Mar. 22, 2019

(65) Prior Publication Data
US 2019/0302395 A1    Oct. 3, 2019

(30) Foreign Application Priority Data
Mar. 30, 2018   (EP) .................................... 18305382

(51) Int. Cl.
*G02B 7/02*    (2021.01)
*B24B 13/005*  (2006.01)

(52) U.S. Cl.
CPC .......... *G02B 7/028* (2013.01); *B24B 13/0052* (2013.01); *B24B 13/0055* (2013.01); *B24B 13/0057* (2013.01)

(58) Field of Classification Search
CPC ... B24B 13/005; B24B 13/0057; B24B 9/146; B24B 13/0052; B24B 9/14; B24D 11/00942; G02B 7/028
See application file for complete search history.

(56) References Cited

U.S. PATENT DOCUMENTS

| | | | |
|---|---|---|---|
| 3,874,124 A * | 4/1975 | Morgan ................. | B23Q 3/086 451/325 |
| 6,036,313 A | 3/2000 | Benjamin et al. | |
| 2002/0159027 A1 | 10/2002 | Tai | |

FOREIGN PATENT DOCUMENTS

| | | |
|---|---|---|
| EP | 2319660 A1 | 5/2011 |
| JP | 63-256327 A | 10/1988 |
| JP | 04-201039 | 7/1992 |
| WO | WO 02/082129 | 10/2002 |
| WO | WO 2004/101260 | 11/2004 |

OTHER PUBLICATIONS

European Search Report, EP 18 30 5382, dated Nov. 9, 2018.
CN Office Action, dated Oct. 16, 2018, from corresponding CN Application No. 201910238737.X.
Chinese Office Action dated Nov. 3, 2020, from corresponding CN application No. 201910238737.X.

\* cited by examiner

*Primary Examiner* — Joel D Crandall
(74) *Attorney, Agent, or Firm* — Nixon & Vanderhye

(57) ABSTRACT

Disclosed is a lens holding block for positioning and retaining a lens substrate in a processing machine, including a bottom part that is able to immobilize the lens holding block in the processing machine and an upper part. The upper part includes a chamber wherein is housed and attached a porous article so as to receive the lens substrate to be processed and which is able to be impregnated with a fluid, and a method for positioning and retaining a lens substrate onto a lens holding block.

11 Claims, 1 Drawing Sheet

LENS HOLDING BLOCK AND METHOD FOR BLOCKING, UNBLOCKING AN OPTICAL LENS COMPONENT

TECHNICAL FIELD OF THE INVENTION

The invention generally relates to a lens blocking and unblocking device and method that may be employed with conventional machining, grinding and processing equipment in the generation of optical lenses, in particular ophthalmic lenses.

Especially, the present invention relates to a lens holding block which is able to temporary fix a lens substrate during at least a step of the generation of the ophthalmic lens, such as during the grinding or milling steps of said lens substrate/blank, or during the application of a functional coating thereon especially during a transfer process (increase in scratch resistance, anti-reflection characteristics, reflective coating, hydrophobic characteristics, etc.).

BACKGROUND INFORMATION AND PRIOR ART

The process of preparing optical lenses, such as ophthalmic lenses, also called generating procedure, begins with an unfinished or semi-finished glass or plastic lens substrate made of transparent material and comprising at least two main faces: a front face and a back face. This lens substrate can be either a plastic or a glass lens substrate.

Conventionally, at least one of these main faces of the lens substrate is subjected to surfacing for producing the optical lens. The surfacing of the substrate comprises all the operations leading to the creation of an optical lens.

Typically, the surfacing comprises three successive steps, namely grinding, fining and polishing.

Grinding is a stage of mechanical processing aiming at applying a curvature to one face of the lens substrate thanks to a coarse grain diamond tool or a milling cutter. By grinding away material from the back surface of the lens substrate the required corrective prescription is generated in order to meet the requirements of the patient.

Fining is also a stage of mechanical processing that is carried out after grinding, using an abrasive tool with a fine grain (diamond, emery, carborundum, etc.). The surface of the substrate after fining in this way has a satin-like appearance. Also lathing by using a single tip turning tool is possible instead of the fining/fine grinding The last operation of surfacing that leads to a perfectly polished and transparent surface is called polishing and again consists in a stage of mechanical processing using felt discs in contact with a suspension of a very fine abrasive (alumina, diamond . . . ).

Grinding which, as indicated above, has as its main objective to confer to at least one main face of the substrate, a desired curvature, is a short stage which results in an opaque or opalescent substrate the ground face of which has ripples, which are defects with a large amplitude and a low frequency, generally in the form of a spiral, over which is a superimposed roughness composed of defects of low amplitude and high frequency. The fining further modifies the geometry of the processed face of the lens substrate but the essential objective of this is to remove the ripples as far as possible and reduce the roughness. This stage of the mechanical processing leads to a translucent (but not yet transparent) article the fined face of which is still rough. Lastly, polishing, a relatively long mechanical processing stage, which does not alter the treated face of the substrate, eliminates the remaining roughness as far as possible in order finally to obtain a transparent optical article.

During these various processing operations, the lens substrate is securely maintained in accurate alignment and in place on a lens holding block. This procedure is often referred to as "lens blocking".

Then, the transparent optical article may be coated by one or several functional coatings during, for instance, a transferring process, wherein a lens holding block is also required so as to maintain/hold the lens substrate. Such a transferring process is described for instance in the document WO 2004/101260.

Finally, the transparent optical article is generally subjected to material-removing processing at its edge for fitting into an associated spectacle frame by a geometrically defined (milling/turning) cutter.

Various materials and designs are employed to secure the lens substrate to the lens holding block.

These materials include glues or pitch. The use of glues and pitch, in addition to being messy, suffers the further disadvantage of generally being non-reusable or non-reclaimable.

It is also known from the prior art to use metal or thermoplastic lens holding block.

For instance, U.S. Pat. No. 6,036,313 discloses examples of compound families suitable for lens blocking with thermoplastic materials.

The disclosed blocking composition may comprise a homopolymer or copolymer of 5 epsilon-caprolactone, and preferably has a number average molecular weight of at least 3,000, a mean bending modulus of at least 69 MPa at 21° C., or a mean flexural strength of at least 1 MPa at 21° C. The composition is solid at 21° C. and has a sufficiently low melting or softening point such that the composition may be placed adjacent to an ophthalmic lens blank while at its melting or softening point without damaging the lens substrate. The composition also has sufficient adhesion to a lens substrate or to a lens substrate coating or tape to hold an ophthalmic lens during a generating procedure.

The document U.S. Pat. No. 6,036,313 discloses a method of holding an ophthalmic lens blank, comprising the steps of:

providing a lens blocking composition as described above;

heating the lens blocking composition to its melting or softening point;

providing a blocking material receiving cavity against the lens blank;

forming the ophthalmic lens blocking composition into the receiving cavity; and allowing the composition to solidify.

Alternatively, a method of holding an ophthalmic lens blank is described, comprising the steps of:

providing an ophthalmic lens block comprising a solidified mass of a thermoplastic blocking composition, and preferably comprising a heat absorbing material;

heating the surface of the lens blocking composition to its melting or softening point;

positioning a lens blank against the softened surface of the lens blocking composition and allowing the composition to re-solidify.

However, the solution disclosed in U.S. Pat. No. 6,036,313 suffers of following drawbacks:

First, even some efforts were made for applying a low amplitude pushing force on the thermoplastic layer, lens breakage still occur due to the fact that the pushing force is applied locally. The lens breakages occur especially when the lens thickness is low.

Secondly, the disclosed blocking/unblocking method requires the use of two adhesive tapes for bonding of the optical lens to the thermoplastic material layer and to the holding unit assembling surface. Those tapes are quite expensive and can not be reused. This has a negative impact for cost of this method.

Accordingly there remains a need for improving blocking/unblocking operations of a lens component, either a sole lens blank or a coated or tape covered lens blank, during the generation procedure of a lens.

Thus, the goal of the present invention is to improve or to provide an alternative to the known lens blocking holder.

SUMMARY OF THE INVENTION

Therefore one object of the invention is to provide a lens holding block for positioning and retaining a lens substrate, preferably in a processing machine, comprising a bottom part forming a tool mount that is able to immobilize the lens holding block in the processing machine and an upper part, characterized in that, said upper part comprises a chamber wherein is housed and attached a porous article so as to receive the lens substrate to be processed and which is able to be impregnated with a fluid.

Thanks to its characteristics, the lens holding block according to the invention enables to easily position and retain a lens substrate to be processed.

The invention also provides the following optional (and thus non-limiting) aspects.

In general, said porous article is as such that:

at a starting temperature ranging from a first predetermined threshold and above a second predetermined threshold, it temporary positions the lens substrate on the lens holding block and at a final temperature below or equal to said second predetermined threshold, it temporary retains the lens substrate.

Especially, said porous article is as such that, above said starting temperature, it unblocks the lens substrate from the lens holding block.

Advantageously, the porous article has a pore size higher than or equal to 20 µm. In particular, the porous article has a pore size ranging from 20 to 450 µm, preferably ranging from 20 to 400 µm, especially ranging from 30 to 300 µm, and typically ranging from 50 to 100 µm.

According to the invention, "a pore size lower higher than or equal to 20 µm" includes the following values and all ranges between these values: 20; 30; 40; 50; 60; 70; 80; 90; 100; 110; 120; 130; 140; 150; 160; 170; 180; 190; 200; 210; 220; 230; 240; 250; 260; 270; 280; 290; 300; 310; 320; 330; 340; 350; 360; 370; 380; 390; 400; 410; 420; 430; 440; 450; etc.

In general, the porous article has open pores. For instance, the open pores represent, by volume, relative to the total volume of the porous article at least 20%, preferably 30%.

As used herein, "at least 20% by volume of open pores" includes the following values and all ranges between these values: 20; 25; 30; 35; 40; 45; 50; 55; 60; 65; 70; etc.

Preferably, the porous article is selected from: a foam material, such as a polyurethane foam material.

Generally, said bottom part 2 and the upper part 5 are made of plastic, such as thermoplastic, or aluminium, stainless steel, or of a combination thereof and is preferably aluminium, stainless steel, or a combination thereof.

Also, one another objet of the invention is to provide a method for positioning and retaining a lens substrate onto a lens holding block according to any one of the preceding claims, wherein the following steps are executed:

a) positioning, according to the desired orientation, a lens substrate onto the porous article impregnated with a fluid by cooling said porous article at the starting temperature such as defined above;

b) retaining the lens substrate by cooling said porous article at the final temperature such as defined above, the cooled fluid acting as a blocking surface.

According to a characteristic of the invention, said first predetermined threshold is equal to or lower than 5° C., preferably equal to or lower than 3° C., especially ranging from 0° C. to 3° C., and is typically of 3° C.

According to another characteristic of the invention, said second predetermined threshold is lower than 0° C., preferably equal to or lower than −2° C., especially ranging from −6° C. to −2° C., and is typically of −4° C. (minus 4° C.).

Preferably, the fluid has a variation of thermal expansion between 4 and 0° C. that is lower than or equal to 0.02%, preferably lower than or equal to 0.015% and typically that is higher than or equal to 0.01%.

Advantageously, the fluid is water, comprising optionally at least one additive, such as salt, one dye, an anti-corrosion agent, a wetting-agent or mixture thereof.

In particular, the rate of impregnation of the fluid, expressed in mass, per unit of mass of porous article is ranging from 0.23 to 0.69 g/cm$^3$, preferably ranging from 0.34 to 0.58 g/cm$^3$ and is preferably around 0.46 g/cm$^3$.

Especially, the fluid is cooled at step a) and/or b) by an external refrigeration unit or by an external thermoelectric cooling device (Peltier).

In general, the method comprises further:

c) execution of a work step, such as milling, turning, grinding, polishing, surfacing;

Generally, the method comprises further:

d) unblocking the lens substrate from the lens holder by heating said porous article at a temperature above the starting temperature, preferably by external heat or by high pressure jet, such as described in the document U.S. Pat. No. 8,931,769 B1.

Further advantages and characteristics of the blocking device according to the invention will be evident to the expert from the following description of preferred embodiments.

BRIEF DESCRIPTION OF THE DRAWINGS

Illustrative embodiments of the present invention are described in detail below with reference to the attached drawing Figures, wherein.

Figure 1:
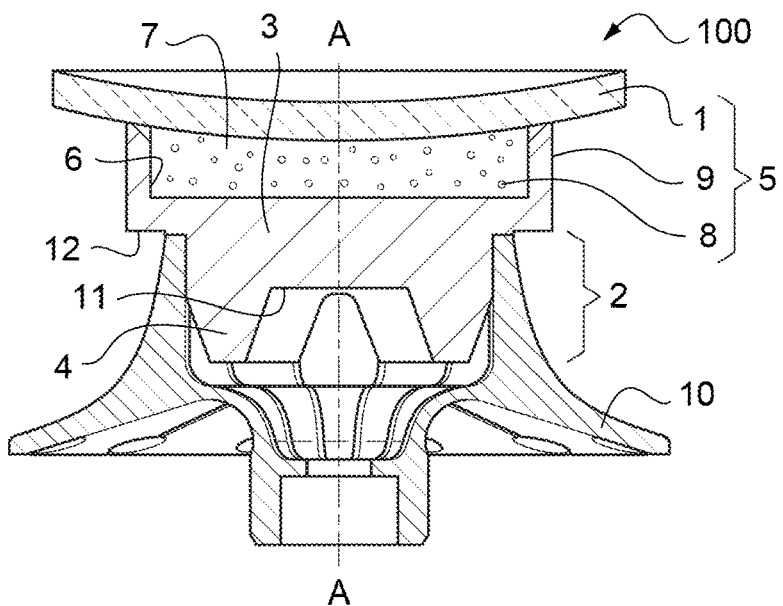
FIG. 1 shows a cross-sectional view of an ophthalmic lens blocked onto a lens holding block according to the invention in a first position.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values «from X to Y» or "between X to Y", according to the present invention, means as including the values of X and Y.

The wording "upper" or "on" and "bottom" or "under" indicates positions relative to the ophthalmic lens component when it is arranged so as the edge of the ophthalmic lens component to be machined is substantially situated in a horizontal plane. Said position is purely conventional and the ophthalmic lens component can be machined in a non-horizontal position.

The invention particularly relates to a lens holding block for blocking optical lens, such as ophthalmic lens, especially spectacle lens comprising a lens substrate, which are to be blocked on a large scale in so-termed "RX workshops" before the blocked ophthalmic lens concerned is subjected to material-removing processing at its back or front surface with respect to its optical effect and/or at the edge for fitting into an associated spectacle frame by a geometrically defined (milling/turning) or geometrically undefined (grinding/polishing) cutter and/or coated on its back or front surface for attainment of additional effects (increase in scratch resistance, anti-reflection characteristics, reflective coating, hydrophobic characteristics, etc.).

Generally, optical lens, preferably an ophthalmic lens comprising a lens substrate is the preferred field of use of the lens holding block according to the invention.

Especially, the lens substrate means an organic or inorganic glass lens, preferably an organic lens, for example a thermoplastic or thermosetting plastic material.

Thermoplastic may be selected from, for instance: polyamides; polyimide; polysulfones; polycarbonates and copolymers thereof; poly(ethylene terephtalate) and polymethylmethacrylate (PMMA).

Thermoset materials may be selected from, for instance: cycloolef in copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

Homopolymers of diethylene glycol bis(allyl carbonate) (CR 39®), allylic and (meth)acrylic copolymers, having a refractive index between 1,54 and 1,58, are preferred.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Particularly recommended substrates include those substrates obtained through (co)polymerization of the diethyleneglycol bis-allyl-carbonate, marketed, for example, under the trade name CR-39® by the PPG Industries company (ORMA® lenses, ESSILOR), or through polymerization of the thio(meth)acrylate monomers, such as those described in the application of the French patent FR 2 734 827. The substrates may be obtained through polymerization of the above monomer combinations, or may further comprise mixtures of such polymers and (co)polymers.

In general, before the blocking, the lens substrate can—but does not have to be—already (pre-) processed and/or (pre-) coated at either or each optically effective surface and/or at the edge.

As an example, the lens substrate has preferably a circular shape; the external diameter of the lens substrate may be between 50 mm to 100 mm, for example equal to 80 mm.

In addition, the ophthalmic lens or the lens substrate can be provided on its surface, at which it is blocked, with a film, lacquer or the like so as to protect this surface against contamination and damage and/or to improve the adhesion properties between lens substrate and the lens holding block, without this being specifically mentioned on each occasion in the following.

Figure 2:
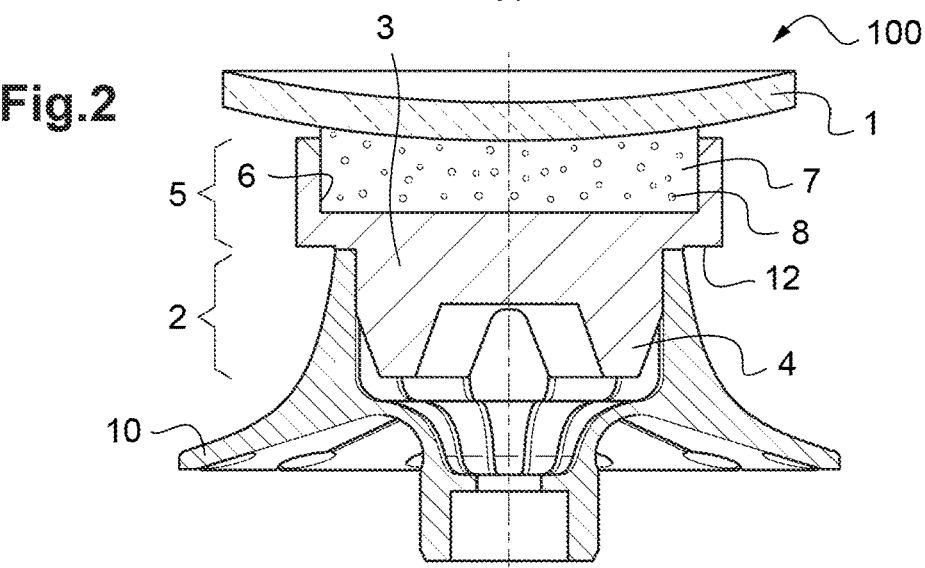
FIG. 2 shows a cross-sectional view of the lens holding block of FIG. 1, wherein the ophthalmic lens is blocked onto the lens holding block in a second position.
Figure 3:
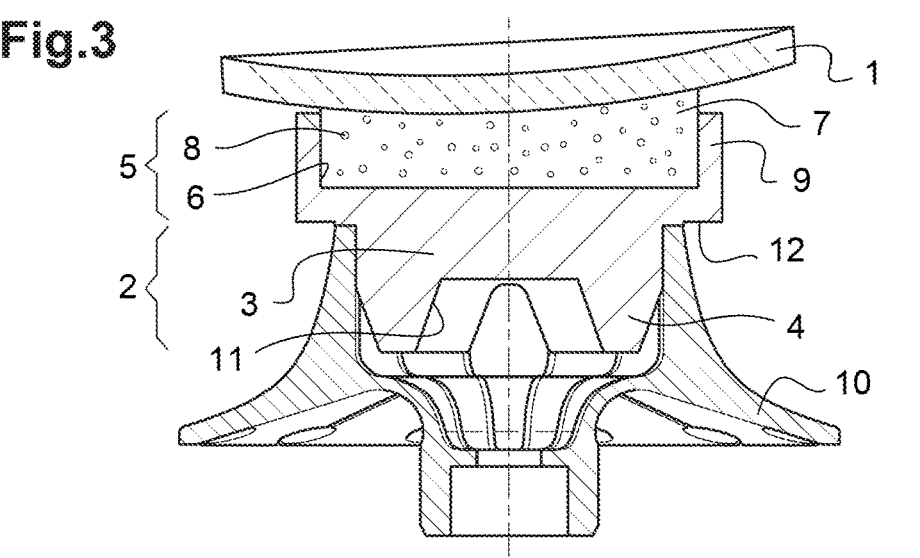
FIG. 3 shows a cross-sectional view of the lens holding block of FIG. 1, wherein the ophthalmic lens is blocked onto the lens holding block in a third position.

As shown by FIGS. 1 to 3, the description of the lens holding block according to the invention will be described hereafter.

As previously mentioned, the holding block 100 for positioning and retaining a lens substrate 1, preferably in a processing machine, comprises a bottom part 2 that is able to immobilize the lens holding block 1 in the processing machine and an upper part 5 comprising a chamber 6 wherein is housed and attached a porous article 7 so as to receive the lens substrate 1 to be processed and which is able to be impregnated with a fluid 8.

Especially, the bottom part 2 of the lens holding block 100 comprises in its lower part fixing means 4 that is able to be attached with a standard receiving element 10 of the lens machining unit, generally called workpiece spindle i.e. a lathe. Indeed, the fixing means 4 has an internal surface such that it is able to fit into the upper surface of the receiving element 10. Generally, the receiving element 10 may be moved or oriented according to the desired RX workshops to perform (grinding, milling, coating, etc.). In addition, the radial exterior wall of the fixing means 4 has a cylindrical section and a conical lead-in chamfer. The front face of the fixing means 4 has a frustoconical indentation.

The bottom part 2 comprises also a central part 11 that is a cylindrical part intended to be squeezed by the receiving element of the machining unit.

For instance, the fixing means 4 corresponds to a design according to DIN 58766 standard (March, 1998). Therefore, the lens holding block 100 according to the invention may be used with any of the machining units for generating ophthalmic articles or within RX workshops.

The bottom part 2, in its higher part, connects the upper part 5, especially the lower end of the upper part 5, of the lens holding block 100. This upper part 5 has an external diameter larger than the diameter of the bottom part 2, that is to say larger than the diameter of the fixing means 4. This section enlargement forms a recess 12 between the higher part of the bottom part 2 and the lower end of the upper part 5 so as to shape an annular support surface for the receiving element 10.

In addition, the upper part 5 comprises along the periphery of the recess 12 and its higher end, an edge 9 delimiting the chamber 6. Generally, this chamber 6 or the edge 9 has a circular section.

For instance, the diameter of this chamber 6 is ranging from 30 mm to 90 mm, preferably ranging from 50 mm to 70 mm.

Especially, the bottom part 2 with the recess 12 and the edge 9 of the upper part 5 form a single piece, called hereafter a tool mount 3.

This tool mount 3 is made of plastic, such as thermoplastic, or aluminium, stainless steel, of a combination thereof.

Preferably, the tool mount is made of aluminium, stainless steel, or a combination thereof. Indeed, these materials enable a quick heat exchange and therefore enable to shorten the cool-down times that is advantageous for the invention as it will be described below.

Furthermore and as previously mentioned, in said chamber 6 is housed and attached, for instance by fixing means such as glue, the porous article 7 of the invention that is able to be impregnated with a fluid 8.

For instance, the glue may be selected from the product commercialized by Huntsman under the tradename Araldite® 2014/H2-C or by Henkel under the tradename Loctite® 490/H1-C.

In particular, the porous article 7 is adapted to receive the lens substrate 1 to be processed. Indeed, as shown by the figures, the lens substrate 1 is based in general onto the porous article 7. However, in some embodiments such as illustrated in FIG. 1, the lens substrate 1 may also be based on the edge 9 of the bottom part 2.

Preferably, the porous article 7 has a pore size higher than or equal to 20 μm. In particular, the porous article has a pore size ranging from 20 to 450 μm, preferably ranging from 20 to 400 μm, especially ranging from 30 to 300 μm, and typically ranging from 50 to 100 μm.

As used herein, "a porous article" means an article/material containing pores (voids), said pores are able to be filled with the fluid 8.

Generally, the porous article 7 may be made in a material selected from a foam material and is preferably a polyurethane foam material. For instance, the polyurethane foam material may correspond to the product commercialized by the company Getzner under the tradename Sylomer®, such as Sylomer® SR28 or may correspond to the product commercialized by the company BSW under the tradename Regufoam® vibration 190 plus.

For instance, the Sylomer® SR28 product has indeed good ability to absorb fluid 8 as it has open pores with interconnection to surrounding pores. Also, this foam has a good flexibility and can therefore adapt easily to the blocking surface geometry of the lens substrate 1. The foam layer can be compressed up to 50% easily.

In particular, the porous article 7 has a thickness lower than or equal to 50 mm, preferably ranging from 10 to 50 mm, especially ranging from 20 to 35 mm and typically of 25 mm.

Especially, the preferred (starting) thickness before performing the method according to the invention which is described below (especially step a) is 25 mm; this value may be decrease to 12 mm at step b) of the method according to the invention. This variance is needed to block the majority of lens substrate curvatures known in the ophthalmic field ranging from 60 mm to 500 mm radius (also referred as sagittal height difference) without using different holding block 100 geometry's.

In addition, using one holding block 100 simplifies operation and minimizes production cost.

As it will be further detail below, the porous article 7 impregnated with a fluid 8 may be cooled so as to obtain a temporary adhesive effect that is able not only to position, but also to retain the lens substrate onto the lens holding device 100.

For that purpose, the lens holding block may be cooled by an external refrigeration unit or by an external thermoelectric cooling device (Peltier) (not illustrated). These techniques are well known from the skilled person and will not be further described here.

Especially, on one hand, the porous article is as such that:

at a starting temperature ranging from a first predetermined threshold and above a second predetermined threshold, it temporary positions the lens substrate 1 on the lens holding block 100 and at a final temperature below or equal to said second predetermined threshold, it temporary retains the lens substrate 100.

On the other hand, the porous article 7 is also as such that, above said starting temperature, it unblocks the lens substrate 1 from the lens holding block 100.

In general, the first predetermined threshold is equal to or lower than 5° C., preferably equal to or lower than 3° C., especially ranging from 0° C. to 3° C., and is typically of 3° C. The second predetermined threshold is generally equal to or lower than 0° C., preferably equal to or lower than −2° C., especially ranging from −6° C. to −2° C., and is typically of −4° C. Hence, according to a characteristic of the invention, the first predetermined threshold is equal to 3° C. and the second predetermined threshold is equal to −4° C.

Now, the method for positioning and retaining the lens substrate 1 onto a lens holding block 100, such as defined above will be described.

Of course, all the characteristics of this lens holding bock 100 defined above are duplicated here for the description of the method according to the invention.

Especially, the method for positioning and retaining a lens substrate 1 onto a lens holding block 100 such as defined above, comprises the following steps:

a) positioning, according to the desired orientation, a lens substrate 1 onto the porous article 7 impregnated with a fluid 8 by cooling said porous article 7 at the starting temperature ranging from a first predetermined threshold and above a second predetermined threshold;

b) retaining the lens substrate 1 by cooling said porous article 7 at the final temperature below or equal to said second predetermined threshold, the cooled fluid acting as a blocking surface.

The Applicant has surprisingly discovered that a fluid 8, that may be a fluid at room temperature (around 20 to 25° C.) can be cooled down to a temperature range (generally from 5° C. to −6° C. and typically from 3° C. to −4° C.) where its viscosity is maximal while having a minimal thermal expansion. At this low temperature range, the porous article 7 impregnated with the fluid 8 is able to give an "adhesive effect" and to form a blocking surface so as to held in position one of the two main surfaces of the lens substrate on the lens holding block 100, even if the other surface of the lens surface is exposed to high temperatures (for instance, during a transfer process). In addition, this low temperature range is of positive effect while cutting a lens substrate made of organic material (i.e.: thermoplastic material) in regard to break the swarf during its formation at the cutting edge of the lens machining unit.

According to a characteristic of the invention, the first predetermined threshold is equal to or lower than 5° C., preferably equal to or lower than 3° C., especially ranging from 0° C. to 3° C., and is typically of 3° C.

According to another characteristic of the invention, the second predetermined threshold is lower than 0° C., preferably equal to or lower than −2° C., especially ranging from −6° C. to −2° C., and is typically of −4° C.

Generally, the fluid 8, that is impregnated into the porous article 7, has a variation of thermal expansion between 4 and 0° C. that is lower than or equal to 0.02%, preferably lower than or equal to 0.015% and typically that is higher than or equal to 0.01%.

Thus, when the porous article 7 impregnated with the fluid 8 such as defined above, is cooled to the starting temperature, generally ranging from 3° C. (included) to −4° C. (excluded), the lens substrate 1 may be position to said porous article 7 and held in position by the adhesive effect induced by the low temperatures. In addition, when the porous article 7 is cooled to or below the final temperature (generally −4° C.), the lens substrate 1 is retained onto the lens holding block 100 according to the invention.

As shown by FIG. 2, during the beginning of this step a), the lens substrate 1 may be in contact only with the porous article 7. Then, the temperature is cooled from ambient temperature to the starting temperature, and the lens substrate 1 may also be held by the edge 9 during the solidification of the fluid 8 inside the porous article 7.

Alternatively, as shown by FIG. 3, during this step a), it is possible to lift up one predefined side of the porous article 7 in order to achieve a tilting angle (prismatic power) which results in a "wedge-like gap" between the edge 9 and the front side of the lens substrate 1. Hence, the lens substrate 1 may also be oriented, generally by a measuring station of the lens blocking unit, to the desired orientation depending on the execution work step (milling, grinding, coating, etc.). Since, the fluid 8 does not shrink or expand during the positioning step a), the position/orientation of the lens substrate 1 may be calculated. Thus, after step b), a grinding step that enables to obtain the corrective prescription, may be performed to achieve the desired and pre-calculated optical power of the lens.

For instance, the fluid 8 may be water.

The Applicant has also discovered that water has many advantages. First, tap water is cheap, everywhere available and easy to recirculate or discharge. Then, water has the highest volume weight and the lowest volume at 4 degree Celsius. Thus, water filled into the porous article 7 shall not shrink or expand during the blocking step and has, at the same time a positive influence in the lens substrate support function. Hence, the temperature control is easy to perform and undesired shrinkage of the fluid 8 that may lead to unwanted deviation of orientation or unwanted relative position between the lens 1 and the lens holding block 100 that may lead to incorrect optical power of the final lens, is avoided. Also, water does provide a certain amount of holding force (adhesion), which is depending on the surface roughness.

Preferably, the fluid 8 may contain at least one additive, such as salt, one dye, an anti-corrosion agent, a wetting-agent or mixture thereof. This additive enables to avoid biologic problems (fungus and bad smell) and to provide anti-corrosion effects. For instance, the salt may be selected from sodium chloride or sodium chlorate or combination thereof.

Specially, the rate of impregnation of the fluid 8, expressed in mass, per unit of mass of porous article 7 is ranging from 0.23 to 0.69 g/cm$^3$, preferably ranging from 0.34 to 0.58 g/cm$^3$ and is preferably around 0.46 g/cm$^3$. Thus, the fluid 8 is contains inside the foam pores. Too much fluid 8 will lead to pollution of the surrounding area. Hence, in general, a correct amount is predetermined (depending on the volume and the opening volume of the porous article 7, as well as the curvature of the lens substrate 1 front side).

Alternatively, a surface tape, known from the skilled person, may be applied between the porous article 7 and the lens substrate 1 so as to increase the adhesion between the lens holding block 100 and the lens substrate 1.

Advantageously, the fluid 8 is cooled at step a) and/or b) by an external refrigeration unit or by an external thermo-electric cooling device (Peltier). Indeed, the holding block 100 may be cooled by Peltier elements or inside a reception that is cooled by refrigerated water in a controlled closed loop. That's why, the tool mount 3 is preferably made of aluminium, stainless steel, or a combination thereof. Indeed, these materials enable a quick heat exchange and therefore enable to shorten the cool-down times. These techniques are well known from the skilled person and will not be further described here.

Then, once the lens substrate 1 is positioned and retained onto the lens holding block 100, the method comprises the c) execution of a work step, such as milling, turning, grinding, polishing, surfacing, etc.

Finally, once the desired work step is performed, the method further comprises: the d) unblocking the lens substrate from the lens holder 100 by heating said porous article 7 at a temperature above the starting temperature, preferably by external heat or by high pressure jet.

For instance, the unblocking step may be perform according to the documents EP 2 542 383 and WO 2001/042091.

The invention claimed is:

1. A method for positioning and retaining a lens substrate (1) onto a lens holding block (100), comprising a bottom part (2) that is able to immobilize the lens holding block (100) in a processing machine and an upper part (5), wherein said upper part (5) comprises a chamber (6) that is housed and attached a porous article (7) so as to receive the lens substrate (1) to be processed and which is able to be impregnated with a fluid (8), said porous article (7) being as such that:

at a starting temperature ranging from a first predetermined threshold and above a second predetermined threshold, it temporarily positions the lens substrate (1) on the lens holding block (100) and at a final temperature below or equal to said second predetermined threshold, it temporarily retains the lens substrate (1), wherein the following steps are executed in said method:

a) positioning, according to a desired orientation, the lens substrate (1) onto the porous article (7) impregnated with the fluid (8) by cooling said porous article (7) at the starting temperature;

b) retaining the lens substrate (1) by cooling said porous article (7) at the final temperature, the cooled fluid acting as a blocking surface, wherein the impregnation of the fluid (8), expressed in mass of fluid per unit of volume of porous article (7), is ranging from 0.23 to 0.69 g/cm$^3$.

2. The method according to claim 1, wherein said first predetermined threshold is equal to or lower than 5° C.

3. The method according to claim 2, wherein said first predetermined threshold is equal to or lower than 3° C.

4. The method according to claim 1, wherein said second predetermined threshold is lower than 0° C.

5. The method according to claim 4, wherein said second predetermined threshold is equal to or lower than −2° C.

6. The method according to claim 1, wherein the fluid (8) has a variation of thermal expansion between 0 and 4° C. that is lower than or equal to 0.02%.

7. The method according to claim 6, wherein the fluid (8) has a variation of thermal expansion between 0 and 4° C. that is lower than or equal to 0.015%.

8. The method according to claim 1, wherein the fluid (8) is water.

9. The method according to claim 1, wherein the fluid (8) is cooled at step a) and/or b) by an external refrigeration unit or by an external thermoelectric cooling device (Peltier).

10. The method according to claim 1, comprising further:

c) execution of a work step comprising one of milling, turning, grinding, polishing and surfacing.

11. The method according to claim 1, comprising further:

d) unblocking the lens substrate from the lens holder (100) by heating said porous article (7) at a temperature above the starting temperature.

* * * * *